(12) United States Patent
Dreisinger et al.

(10) Patent No.: US 8,585,991 B2
(45) Date of Patent: Nov. 19, 2013

(54) METHOD FOR RECOVERING INDIUM, SILVER, GOLD AND RARE, PRECIOUS AND BASE METALS FROM COMPLEX OXIDE AND SULFIDE ORES

(75) Inventors: David Dreisinger, Delta (CA); Ralph Fitch, Denver, CO (US); Cornelis Verbaan, Denver, CO (US)

(73) Assignee: South American Silver Corp., Vancouver (CA)

( * ) Notice: Subject to any disclaimer, the term of this patent is extended or adjusted under 35 U.S.C. 154(b) by 0 days.

(21) Appl. No.: 13/462,698

(22) Filed: May 2, 2012

(65) Prior Publication Data

US 2012/0328494 A1     Dec. 27, 2012

Related U.S. Application Data

(60) Provisional application No. 61/481,647, filed on May 2, 2011.

(51) Int. Cl.
  *C22B 3/00*     (2006.01)
(52) U.S. Cl.
  USPC .............. 423/38; 423/39; 423/40; 423/98; 423/109; 423/122; 423/132; 75/724; 75/726; 75/733; 75/736
(58) Field of Classification Search
  USPC .......... 423/38–40, 98, 109, 122, 132; 75/710, 75/711, 724, 726, 733, 736
  See application file for complete search history.

(56) References Cited

U.S. PATENT DOCUMENTS

| | | | |
|---|---|---|---|
| 2,283,198 A * | 5/1942 | Fink et al. | 423/38 |
| 3,545,964 A * | 12/1970 | Hansen et al. | 423/38 |
| 4,378,275 A | 3/1983 | Adamson et al. | |
| 2002/0152845 A1 | 10/2002 | Fleming et al. | |
| 2002/0159927 A1 | 10/2002 | Allen et al. | |
| 2004/0156765 A1* | 8/2004 | Lalancette | 423/40 |
| 2004/0228783 A1 | 11/2004 | Harris et al. | |

FOREIGN PATENT DOCUMENTS

WO      03023077     3/2003

OTHER PUBLICATIONS

International Search Report for PCT/CA2012/000372, mailed Aug. 8, 2012.
Sheedy, M. "Recoflo Ion Exhange Technology" Proceedings TMS Annual Mtg 1998, San Antonio. Texas.

* cited by examiner

*Primary Examiner* — Steven Bos

(57) ABSTRACT

The present invention relates to methods for recovering precious metals including silver and gold, rare metals including indium and gallium, base metals including copper, lead and zinc or a combination of precious, rare and base metals from complex oxide ores, sulfide ores or oxide and sulphide ores using an acid chloride oxidizing leach.

52 Claims, 3 Drawing Sheets

METHOD FOR RECOVERING INDIUM, SILVER, GOLD AND RARE, PRECIOUS AND BASE METALS FROM COMPLEX OXIDE AND SULFIDE ORES

FIELD OF THE INVENTION

The present invention relates generally to a recovery process of metals from ores. More particularly, the present invention relates to the recovery of precious metals including silver and gold, rare metals including indium and gallium, or base metals including copper, lead and zinc or a combination of precious, rare and base metals from complex oxide ores, sulfide ores, or from a combination of oxide and sulfide ores using acid oxidizing leaching.

BACKGROUND OF THE INVENTION

The concentration of indium in the earth's crust is approximately 0.25 ppm by weight. Economic ores of indium are seldom found in nature. Indium is generally recovered as a by-product of zinc or copper concentrate treatment. For example at the Dowa refinery in Iijima, Japan, indium is extracted into a sulphuric acid solution and through pH adjustment, is precipitated as a crude indium hydroxide product. The indium hydroxide is then refined to pure indium (typically about 99.99% purity) using a series of chemical dissolution and precipitation steps in combination with solvent extraction and electrochemical reduction to metal.

Similarly, indium rich fumes from zinc fuming operations (e.g., carbothermic reduction of lead slags) or indium rich dusts from copper smelting operations are often processed using acid leaching and precipitation to produce indium hydroxide products for refining.

Indium is in high demand for use in many high tech applications, including indium-tin-oxide (ITO) in liquid crystal displays and touch screens, high efficiency thin film solar panels, or LED lighting and fiber optics.

The supply of indium is generally constrained due to the direct link with copper or zinc production at producer sites. In order to advance and expand the applications of indium, it is desirable to develop new resources. The Malku Khota deposit in Bolivia contains a mix of valuable metals including indium, silver, gold, copper, lead, zinc, gallium and other rare metals.

SUMMARY OF THE INVENTION

In various embodiments, a method is provided for recovering a metal from an ore, which in various embodiments may be an oxide ore, a sulfide ore or a combination of oxide and sulfide ores. In various embodiments, the metal may be a rare metal, a precious metal, a base metal ore a combination thereof. The method comprises:
  (a) contacting the ore with an acid, a chloride salt, and a soluble oxidant under a selected condition to form an ore waste and an acid-soluble oxidant leach solution comprising the metal; and
  (b) separating the acid-soluble oxidant leach solution from the ore waste.

In various embodiments, the metal may for example be one or more of In, Ag, Au, Pb, Cu, Zn, Ga. In various embodiments, the acid may be for example sulfuric acid, hydrochloric acid, or a combination thereof. In various embodiments, the sulfuric acid or hydrochloric acid may be used, for example, in concentrations ranging from about 10 g/L to about 100 g/L of the acid. In various embodiments, the chloride salt may be for example sodium chloride, potassium chloride, calcium chloride, magnesium chloride or any salt which can be a source of chloride in the solution to stabilize the dissolved metals as metal-chloride complexes. In various embodiments, the soluble oxidant comprises for example sodium hypochlorite, sodium chlorate, sodium chlorite, other oxidants such as for example gaseous chlorine, hypochlorous acid (HOCl), Caro's acid $H_2SO_5$ or a combination thereof. In various embodiments, the chloride salt may be used at a concentration ranging from about 1 to about 3.5 mol/L. The acid-soluble oxidant leach solution may include an acid-chloride leach solution. In various embodiments, the step of contacting the lixiviant with ore may for example involve heap leaching, vat leaching stirred reactor leaching, mixing or a combination thereof. The selected conditions may include a selected temperature, such as from about ambient temperature to a boiling point. In various embodiments, the oxide ores, the sulfide ores or a combination thereof may be pretreated, for example, by dry grinding, wet grinding or a combination of these processes. In various embodiments, the pretreatment may be carried out so as to produce particles having a size ranging from about ⅛ inch to about 1 inch or more, and/or to produce a fine ore material and a coarse ore material. The fine ore material and the coarse ore material may be treated separately using the methods of the invention. In selected embodiments, the acid concentration may be modulated in the acid-soluble oxidant leach solution, for example by acid recovery from the acid-soluble oxidant leach solution to form a recovered acid and an acid-depleted leach solution comprising a residual acid. In various embodiments, the acid recovery may be performed using a solvent extraction which comprises contacting the acid-soluble oxidant leach solution with a solvent to form a loaded solvent comprising an extracted species. In various embodiments, the solvent is a solvating extractant comprising an alkyl phosphate, an alkyl phosphonate, an alkyl phosphinate or a combination thereof. In various embodiments, the alkyl phosphate is tri-butyl-phosphate, the alkyl phosphonate is di-butyl-butyl phosphonate, and the alkyl phosphinate is Cyanex 923. In various embodiments, the extracted species is an iron chloride-hydrochloric acid species (e.g., $HFeCl_4$).

In various embodiments, the loaded solvent may be scrubbed with an aqueous solution (e.g. water) to form a washed loaded solvent comprising $FeCl_3$ and HCl, and subsequently stripped with additional aqueous solution (e.g., water) to displace $FeCl_3$ and HCl (form a solution comprising $FeCl_3$ and HCl). In various embodiments, the solution comprising $FeCl_3$ and HCl is subjected to pre-evaporation to form a pre-evaporated $FeCl_3$ and HCl solution, and may be further thermally decomposed (e.g., by spray roasting, pyrohydrolysis, heating or a combination thereof) to produce hematite and regenerate the hydrochloric acid. The recovered acid may for example be recycled to the contacting step and the hematite may be recovered as a valuable product. Acid neutralization of the residual acid in the acid-depleted leach solution may also be carried out, for example by contacting the acid-depleted leach solution with a neutralizing agent such as calcium carbonate, dolomite, lime, sodium hydroxide or a combination thereof. A separation step may be used, to recover the metal from the acid-depleted leach solution, such as cementation, precipitation or a combination thereof. In various other embodiments, precipitation may involve a pH adjustment, an addition of a source of sulfide, aeration or a combination thereof. The pH adjustment may involve an addition of sodium hydroxide, limestone, calcium hydroxide, magnesium oxide or a combination thereof. The pH adjustment may be carried out so as to result in a pH of about 1 to about 1.25, about 1.25 to about 1.5, about 5.0 to about 5.5, or about 5.5 to about 6.0. The source of sulfide may for example be sodium hydrogen sulfide, hydrogen sulfide gas or a combination thereof. In various embodiments, a seed material may be added to the precipitation. In selected embodiments, cementation may be carried out so as to produce a cement comprising Au, Ag, Cu or a combination thereof. In various embodiments, cementation of Au and Ag may be obtained using, for example, copper metal. The Ag/Au cementation solution now free of Ag/Au may be then treated by iron cementation to remove copper. Thus a separate precious metal precipitate for refining at a precious metal refinery and a separate copper product are produced. In various embodiments, the solution free of iron, silver, gold, copper may be then sent to In/Ga precipitation by raising the pH to produce the In/Ga hydroxide product for further refining. In various embodiment, after In/Ga removal, the solution may be sulphidized with NaSH or other forms of sulfide to precipitate the Pb and Zn as separate Pb and Zn sulphide concentrates. In alternative embodiments, the precipitation may be carried out so as to produce separate products such as, for example, gypsum, and $Fe(OH)_3$.

DETAILED DESCRIPTION OF THE INVENTION

Figure 1:
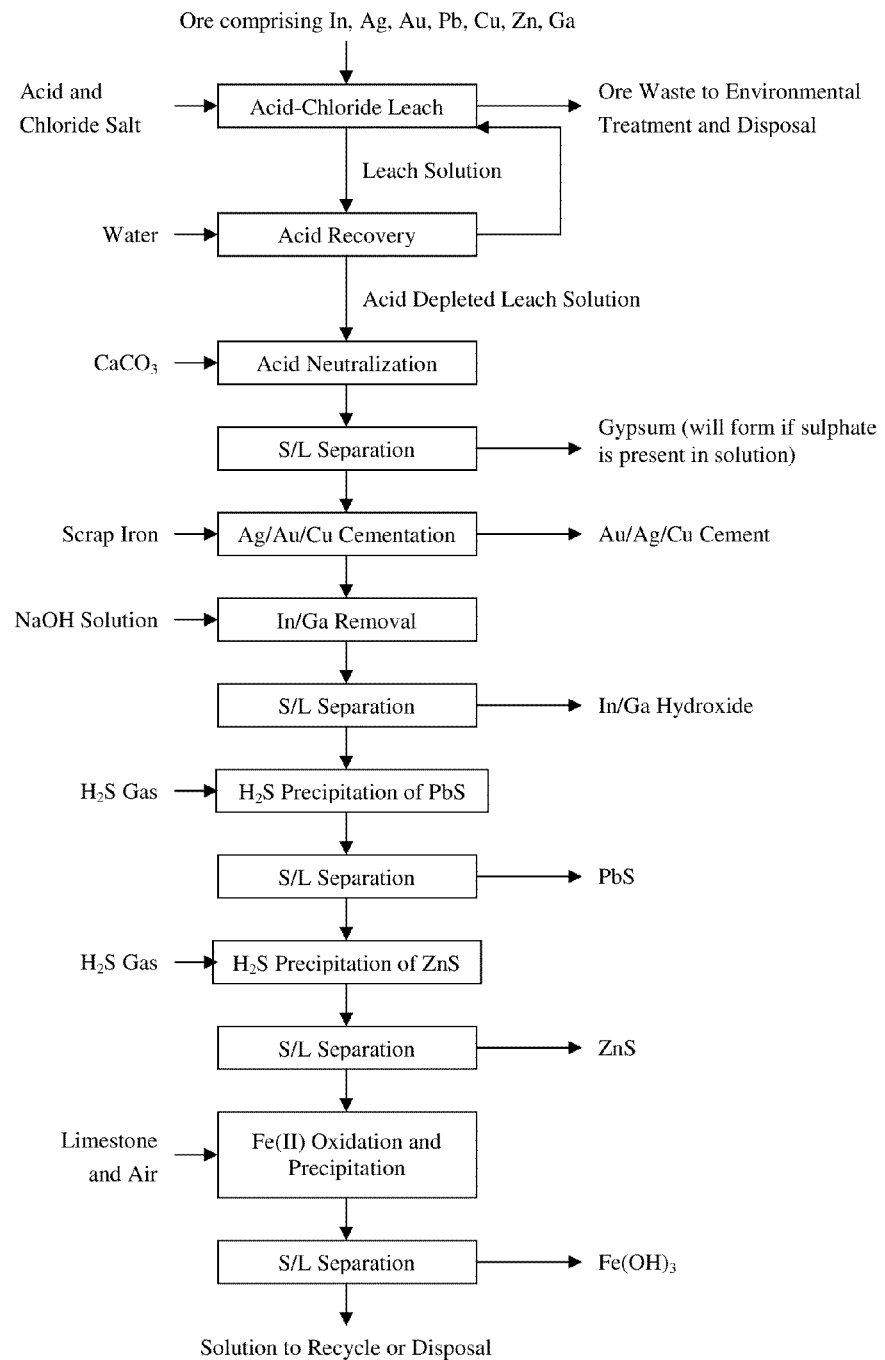
FIG. 1 is a flowsheet showing the leaching of an ore comprising indium, silver, gold, copper, zinc, lead, and gallium followed by acid recovery and recycle and sequential value recovery in a series of steps, according to an embodiment of the invention. The flowchart also illustrates that, in selected embodiments, the solution is treated to remove residual iron, and then recycled.

In various aspects, the invention provides for an extraction of precious metals including silver and gold, rare metals including indium and gallium, base metals including copper, lead and zinc, or a combination of precious, rare and base metals from a complex ore using an acid chloride oxidizing leach to form a leachate or a leach solution. The complex ore may be an oxide ore, a sulfide ore or a combination of oxide and sulfide ores. In various embodiments, the extraction can be followed by a treatment of a portion of or all of the leachate for metal recovery. A selected embodiment involves the treatment of ores from the Malku Khota ore deposit in Bolivia, containing various minerals of indium, silver, gold, copper, zinc, lead and other metals. The minerals include a range of oxides, hydroxides and sulphides.

In various embodiments, the first step in the process entails establishing chemical conditions for extraction of the metal of interest or a combination of metals. For example, in various embodiments, establishing chemical conditions may involve acid chloride leaching with an addition of a soluble oxidant. In various embodiments, the soluble oxidant may for example be sodium hypochlorite, sodium chlorate, sodium chlorite or a combination thereof, or other oxidants such as for example gaseous chlorine, hypochlorous acid (HOCl), Caro's acid $H_2SO_5$ or a combination thereof. In various embodiments, acid chloride oxidizing leaching conditions (e.g., using sodium hypochlorite) may be selected so as to yield high extractions of indium, silver, gold, copper, zinc, lead, gallium, other rare, precious and base metals, or a combination thereof from complex ores such as oxide ores, sulfide ores, or oxide and sulfide ores. In various embodiments, the acid chloride leaching conditions can be established by mixing, for example, hydrochloric acid (HCl) with a chloride salt (e.g. NaCl, KCl, $CaCl_2$, $MgCl_2$). The chloride salt adds chloride to the solution to stabilize the dissolved metals as metal-chloride complexes. In various other embodiments, the acid chloride leaching conditions can also be established by mixing, for example, sulphuric acid ($H_2SO_4$) with the chloride salt. If the chloride salt is NaCl for example, the resultant mixture can effectively be viewed as a mixture of HCl, NaCl and $Na_2SO_4$ acids and salts.

For example, the leaching of the valuable metals in the presence of sodium hypochlorite, according to an embodiment of the invention, can be illustrated through the following simplified chemical reactions in Table 1:

TABLE 1

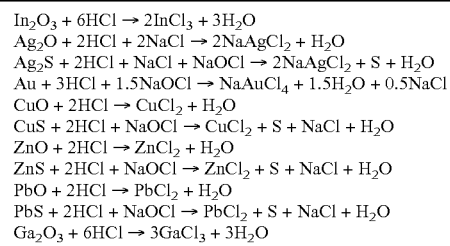

In various embodiments, the rate and extent of leaching of indium, silver, gold, base, rare metals or a combination thereof has been found to be aided by using high levels (concentrations) of acid in solution. For example, the level of acid in solution may range from about 10 g/L to about 100 g/L. In the reactions shown in Table 1, acid is a reactant on the left hand side. The consumption of acid in the leaching process is dictated by the acid consumed in the reactions as is shown for examples in Table 1, associated acid-consuming reactions as well as any need for neutralization of acid that may be required in some embodiments ahead of the metal recovery steps. The presence of acid consuming species such as, for example, minerals of iron, aluminum, calcium, magnesium, manganese, antimony, arsenic and other metals is undesirable as demonstrated by the simplified example reactions in Table 2.

TABLE 2

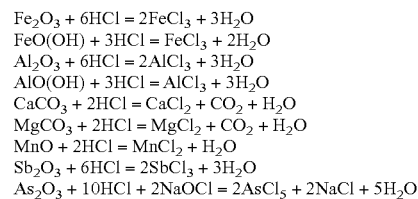

The consumption of acid by the acid consuming species such as those shown in Table 2 may be, in some embodiments, difficult to avoid and dependent on the minerals present in the raw material, the acid concentration employed in the process, the leach time, the temperature of leaching or a combination thereof.

In various embodiments, the excess acid may be controlled by employing an acid recovery step. For example, in selected embodiments, the Eco-Tec Recoflo process for acid recovery may be used, which employs a bed of finely ground strong base ion exchange resin to adsorb HCl from the metal bearing leachate. Other acid recovery systems may also be employed in other embodiments including for example solvent extraction of acid. The adsorbed HCl is then stripped using a countercurrent flow of water to enable retention of HCl in the leach circuit and avoid the cost of neutralization of acid prior to metal recovery.

In various embodiments, the formation of, for example, iron chloride salt(s) (e.g., $FeCl_3$) is generally responsible for a significant component of the consumption of acid such as, for example, hydrochloric acid (e.g., $Fe_2O_3 + 6HCl = 2FeCl_3 + 3H_2O$) in the process according to the various embodiments. In selected embodiments, a solvent extraction process is used for recovering, for example, iron chloride salts and acid (e.g., HCl) from the leach solution (e.g., heap leach solution).

According to an embodiment, the solvent extraction process involves loading a mixed iron chloride-acid species (e.g., iron chloride-hydrochloric acid species such as for example $HFeCl_4$) onto a solvent which comprises a solvating extractant to form a loaded solvent. In various embodiments, the solvating extractant may comprise, for example, an alkyl phosphate (e.g., tri-butyl-phosphate (TBP)), an alkyl phosphonate (e.g., di-butyl-butyl phosphonate (DBBP)), an alkyl phosphinate (e.g., Cyanex 923) or a combination thereof. In various embodiments, the solvent extraction process is selective for $FeCl_3$ and acid (e.g., HCl) over one or more "pay metals" including the chloride species of, for example, Ag, In, Ga, Cu, Zn, Pb, Au or a combination thereof.

In various embodiments, the loaded solvent (e.g., comprising the solvating extractant such as, for example TBP) is scrubbed with, for example, water to form a washed loaded solvent. Scrubbing with water is similar to washing of any co-extracted species from the loaded solvent. In various embodiments, the washed loaded solvent is then stripped with additional water (aqueous solution) to displace, for example, $FeCl_3$ and acid (e.g., HCl) into a strip solution.

In various embodiments, the solution comprising displaced $FeCl_3$ and HCl is subjected to pre-evaporation to form a pre-evaporated $FeCl_3$ and HCl solution. This is important for increasing the efficiency of the subsequent decomposition process by providing a higher concentration of iron chloride According to various embodiments, the strip solution comprising the $FeCl_3$ and acid (e.g., HCl) is subjected to thermal decomposition. In various embodiments, the thermal decomposition may be performed, for example, by "spray roasting", "pyrohydrolysis" or heating in a decomposer at a suitable temperature. In various embodiments, the temperature suitable for decomposition may be for example 180° C. or more. The decomposition converts the iron chloride to hematite and regenerates the acid (e.g., hydrochloric acid) (e.g., $2FeCl_3 + 3H_2O = Fe_2O_3 + 6HCl(g)$; HCl=HCl (gas)).

In various embodiments, the acid (e.g. HCl) that is regenerated is condensed, and may be, for example, recycled back to the contacting step of the process for recovering a metal from an ore, which reduces the overall requirement for acid addition to the plant circuit. The $Fe_2O_3$ (hematite) is recovered as a valuable product.

According to various embodiments, the solvent extraction process also produces an acid depleted and iron depleted solution. In various embodiments, in which the iron was substantially depleted from the leach solution by using, for example, the solvent extraction process, the resultant iron depleted solution (substantially iron-free solution) may be further used in the other process steps in the recovery of valuable metals in accordance with various embodiments, examples of which are illustrated in FIG. 1.

In a particular embodiment, any residual free acid in the iron depleted solution may be substantially neutralized. For example, limestone may be used in a preferred embodiment. Other neutralizing compounds may be, for example, dolomite, lime, sodium hydroxide or a combination thereof.

Following neutralization, in various embodiments, the cementation of Au and Ag can be performed using for example copper metal which produces a rich cementate of Au—Ag for further refining. The resultant Ag/Au cementation solution, which is substantially free of Ag, Au or a combination of Ag and Au, can then be treated by iron cementation to recover copper. As a result of the above described processing, a separate precious metal precipitate is formed, which may be used for refining at a precious metal refinery, and a separate copper product.

The resultant solution substantially free of iron, silver, gold, copper may be then sent to In/Ga precipitation by, for example, raising the pH, which produces the In/Ga hydroxide product for further refining.

Following In/Ga removal, the solution may be then sulphidized with, for example, NaSH or other forms of sulphide in order to precipitate the Pb and Zn as separate Pb and Zn sulphide concentrates.

According to another embodiment, the recovery of valuable metals from the acid chloride solution (after, for example, optional recovery of excess acid using the Recoflo system in selected embodiments or other acid recovery methods) can proceed by a number of steps. Surprisingly, the metals can be separated and recovered, for example, as valuable precipitates or cementates using a series of chemical steps. For example, the first step can involve the neutralization of excess acid using limestone, e.g., $CaCO_3 + 2HCl = CaCl_2 + CO_2 + H_2O$. In various embodiments, the next step can involve reductive precipitation of silver, gold, copper, arsenic or a combination thereof with metallic iron. At the same time, in selected embodiments, ferric chloride can be reduced to ferrous chloride to prevent or reduce interference of the ferric ion with the recovery of indium by pH adjustment (Table 3).

TABLE 3

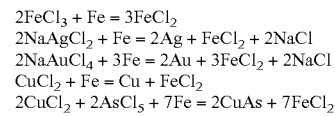

The mixed Ag—Au—Cu—As product can then be processed, for example, via toll smelting/refining or hydrometallurgical extraction methods to recover pure final products of the individual metals.

In yet other embodiments, the next step can be the precipitation of a crude indium hydroxide precipitate by pH adjustment (Table 4). Aluminum, residual Fe(III) (if any), chromium, gallium or a combination thereof can also be precipitated by pH adjustment (e.g., as is shown in Table 4).

TABLE 4

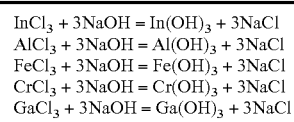

In various embodiments, the crude indium precipitate can then be processed by a series of acid dissolution/reprecipitation, solvent extraction and electrochemical reduction steps to produce a pure indium product and gallium by-product. The product solution from indium recovery can then be treated by a series of sulphide precipitation steps to form synthetic separate or mixed zinc sulphide and lead sulphide concentrates (e.g., Table 5).

TABLE 5

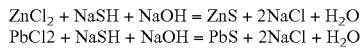
$PbCl_2 + NaSH + NaOH = PbS + 2NaCl + H_2O$

In various embodiments, the final product solution containing chloride salts may be recycled or disposed. For recycle back to the process, it is necessary for the iron in solution to be removed, which may be performed, for example, by oxidation and precipitation: $4FeCl_2+O_2+6H_2O+4CaCO_3= 4Fe(OH)_3+4CaCl_2+4CO_2$.

The mined ore, which in various embodiments may for example contain indium, silver, gold, copper, zinc, lead, gallium, or a combination thereof, can be optionally reduced in size prior to further processing. In various embodiments, various broad particle size ranges may be engineered in order to use heap or dump leaching, vat leaching, stirred reactor leaching or a combination thereof. For example, in various embodiments, heap or dump leaching may be performed using material crushed to a P80 (product size is 80% passing the nominal size listed) of about ⅛ inch to greater than about 1 inch. Stirred reactor leaching may be performed at a size of less than about 500 μm (about 0.5 mm). In various embodiments, it may be desirable to have a finer size than about 500 μm to reduce any potential problems with abrasion. In various embodiments, agitated leaching may be performed at a size of about 50 μm. In various other embodiments, vat leaching may be performed using material crushed (and optionally ground for the finer size range) to a P80 of about 0.2 inch (about 0.5 mm) to greater than about 1 inch. In various embodiments, crushing may be conducted without water addition. However, in other embodiments, optionally "water-flush" crushing may be used to elutriate the fine materials formed during the crushing operation, or a combination of dry crushing and "water-flush" crushing. The above methods provide for treating the fine material separately from the coarse material. In various embodiments, grinding can be conducted with water addition. Water addition for grinding may be obtained, for example, from available fresh water, brackish water, recycle neutral chloride-containing solutions or any other source.

In various embodiments, the leaching of the ore can be conducted in vessels having various configurations, for example, heaps, vats or in a series of stirred reactors. In particular embodiments, the leaching of ore in heaps or vats can be performed by applying the leach solution containing acid and the chloride salt. In various embodiments, the acid may be sulphuric acid or a hydrochloric acid having a concentration ranging from about 10 g/L to about 100 g/L of the acid, and additionally the chloride salt such as NaCl may have a concentration ranging from about 1 mol/L to 3.5 mol/L.

In various embodiments, the temperature, the time for extraction or a combination thereof may be modulated. For example, the temperature may range from ambient (e.g., 10° C. in Bolivia) to the boiling point (which will vary with altitude). In various embodiments, the time for extraction may vary from days to months to years depending on the particle size, mineralogy, rate of extraction, economics of continuing leaching or a combination thereof. In various embodiments, the leachate obtained from heap or vat leaching can be recovered and directed to acid recovery or metal recovery process steps. In further embodiments, the leached ore may be washed in order to recover retained leach solution containing dissolved metals and residual reagents such as acid and chloride salt. In various embodiments, the leaching of ore in an agitated tank may be performed by mixing the ground ore slurry with the leach solution containing acid and the chloride salt having, for example, concentration ranges as described above. At the conclusion of agitated tank leaching, the leached solids can be separated and washed using, for example, counter—current thickening and washing, filtration or a combination thereof.

In various embodiments, the leached solids from heap, vat or agitated tank leaching may be treated with chemical or physical processes or a combination of chemical or physical processes in order to render the materials acceptable for environmental disposal. In various embodiments, the leaching process may also be applied to a concentrate that is recovered from the ore using physical or chemical concentration methods or a combination of chemical or physical methods.

The leachate obtained from the heap/dump, vat or agitated tank leaching process can contain dissolved metals (for example, indium, silver, gold, copper, zinc, lead, gallium or a combination thereof), residual acid, other chloride salts, or a combination thereof.

In particular embodiments, the residual acid may be recovered using an acid recovery method such as the Eco-Tec Recoflo system, and may be recycled back to the leaching step (e.g., as is shown in FIG. 1). The Recoflo system involves pre-filtration of fine solids followed by loading and eluting of acid from an ion exchange resin. The eluate used for this process is water. Accordingly, two solution products can be produced from the acid recovery step—an acid-depleted solution that, in various embodiments, advances to neutralization and metal recovery process steps, and an acid recovery solution that, in various embodiments, is recycled back to the leaching process. In various other embodiments, the residual acid may be recovered by bypassing the acid-containing solution directly to neutralization or using another acid recovery process, such as for example solvent extraction.

Figure 2:
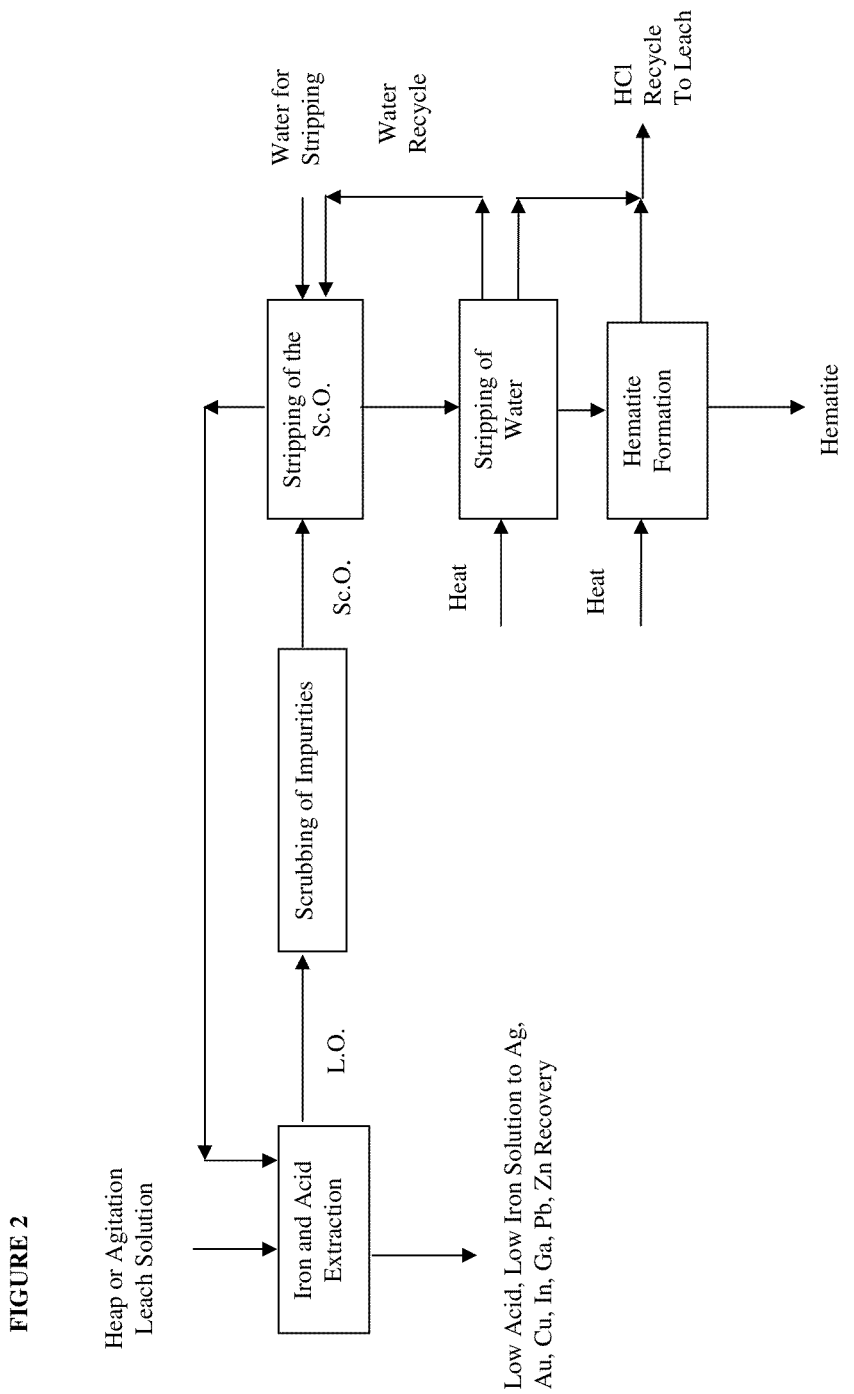
FIG. 2 is a flowsheet showing the solvent extraction process to recover, for example, an iron chloride salt or salts and hydrochloric acid from the heap leach solution according to an embodiment of the invention.

In yet another embodiment, the solvent extraction process may be used to recover iron and acid is shown for example in FIG. 2. The recovered acid may be recycled back into the contacting step of the process to recover a metal from an ore shown for example in FIG. 1.

In various embodiments, the acid depleted solution from the acid recovery process is neutralized to remove excess acid prior to the cementation process for recovery of, for example, silver, gold, copper or a combination thereof. In various embodiments, the process can involve the addition of either a soluble alkali (e.g., NaOH or $Na_2CO_3$) or a solid alkali (e.g., finely ground limestone or lime). In various embodiments, the pH for the neutralization will depend on the temperature and concentration of various elements in solution (e.g., especially Fe(III) and Al(III)). A pH ranging from about 1 to about 1.5 (e.g., typically pH of about 1.25) is suitable for neutralization. In various embodiments, the pH can be increased as high as possible without any precipitation of metal hydroxides from solution. If limestone or lime is added for pH adjustment, gypsum ($CaSO_4.2H_2O$) may form if sulphate is present in solution. If gypsum forms in the neutralization step, it must be removed and washed prior to cementation.

In further embodiments, the neutralized solution can be directed to reductive cementation of silver, gold, copper or a combination thereof. Scrap iron may be used as a suitable reductant for this step. Alternatively, scrap aluminum or zinc powder or any other suitable reductant may be used. The reductive cementation can be carried out in either a stirred reactor or in a cementation contactor (e.g., Kennecott Contactor) to provide sufficient time for the reaction to cement (reduce) silver, gold, copper or a combination thereof from solution. An excess of reductant (beyond stoichiometric amount) is required in order to allow for some excess iron in the final cement product and to allow for parasitic side reactions (example formation of hydrogen by reaction of residual acid and reductant and reduction of residual ferric ion (Fe (III)) to ferrous (Fe(II))). In various embodiments, the time for reductive cementation can range from minutes to hours, and the cementation can be carried out at temperatures of about 10° C. to the boiling point. The cement product containing silver, gold, copper and arsenic or a combination thereof can be removed from the solution and washed. The cement product may be treated using various currently available methods. The solution barren of silver, gold, copper or a combination thereof can be advanced to indium and gallium recovery.

The recovery of indium and gallium can be accomplished in various embodiments by raising the pH of the solution to the point where indium and gallium are precipitated. For example, a pH value of about 5.0 to about 6.0 can be used for the purpose of precipitation (typical value is about 5.5). At this pH, indium and gallium can be recovered from solution with high efficiency. The indium and gallium precipitate is recovered from solution and washed. The indium and gallium precipitate can then be processed using known methods to achieve high purity indium and gallium products.

In various further embodiments, the solution free of indium and gallium is forwarded to sulfide precipitation steps. Sulfide precipitation is used to make either separate or combined lead and zinc sulfide precipitates for sale or further treatment. In various embodiments, the source of sulfide can be a sulfide chemical (e.g., sodium hydrogen sulfide, NaSH) or a sulfide gas (e.g., hydrogen sulfide, $H_2S(g)$). In various embodiments, the sulfide is added to the solution at a controlled rate and optionally at a controlled pH (e.g., pH adjustment must be performed with a soluble alkali such as NaOH or $Na_2CO_3$). The sulfide is provided in a stoichiometric amount to satisfy the chemical requirements for precipitation. The ORP (oxidation-reduction potential measured against the Ag/AgCl reference electrode) may be measured during the precipitation process in order to control the selectivity of precipitation.

In various embodiments, lead precipitation can be maximized at ORP values of about 100 to about −100 mV (typically about 0 mV) (measured using a Ag|AgCl ORP electrode). The precipitation of zinc then continues to lower values of ORP (e.g., about −100 to about −300 mV, typically about −200 mV). The pH for precipitation may be controlled or left to vary in accordance with the chemistry of precipitation. If pH control is used, a pH of greater than about 1.5 should be targeted. The precipitated lead and zinc sulfide are recovered from the solution separately or together as a combined product, and can be washed.

In yet further embodiments, the solution free of zinc and lead is directed to an iron precipitation stage. The iron precipitation may be conducted with addition of limestone for pH adjustment and aeration for oxidation of ferrous (Fe(II)) to ferric (Fe(III)) for precipitation and removal of iron from solution. In various embodiments, the pH should be controlled to maximum values (e.g. a pH of about 5 to about 5.5) and air should be provided in excess in order to oxidize and precipitate iron from solution. The iron oxy/hydroxide precipitate can be removed from solution and washed and disposed. In further embodiments, the iron free solution may be returned back to the leaching process as a source of soluble chloride.

In selected embodiments, in cases where there is a precipitation, it is advantageous to "seed" the precipitation by recycling a portion of the solids back to the start of the precipitation process. In this way, the precipitate can have the opportunity to grow to a coarser size and become easier to settle, if thickened, or filter and wash.

The examples demonstrate the various embodiments of the invention as illustrated in FIG. 1, which aside from the acid chloride oxidizing leaching shows additional processing that may be performed in various embodiments on the leach solution and other products of the process. The examples further demonstrate the various embodiments of the invention relating to the process illustrated in FIG. 2.

EXAMPLES

Example 1

Acid Leaching of Mineral Sample Containing Indium, Silver, Gold, Copper, Lead, Zinc, Gallium A series of six samples designed 08-1 to 08-2 were prepared by grinding to a P80 particle size of approximately 50 μm and leaching at about 50° C. in a solution containing about 100 g/L $H_2SO_4$ and about 3 M NaCl. Two methods of addition of NaOCl were used. In the first case, a standard about 1 g/L NaOCl was used for leaching at about 35% solids content. In the second case, additional NaOCl was added to maintain an ORP of about +950 mV (versus Ag/AgCl reference electrode). The chemical analysis of the samples 08-1 to 08-6 are shown in Table 6 below. The acid chloride leach extractions from samples 08-1 to 08-6 are shown in Table 7.

TABLE 6

| Element | 08-1 | 08-2 | 08-3 | 08-4 | 08-5 | 08-6 |
|---|---|---|---|---|---|---|
| In (g/t) | 5.2 | 60 | 6.8 | 89 | 32 | 26 |
| Ag (g/t) | 135 | 232 | 777 | 46 | 9.91 | 22.9 |
| Au (g/t) | <0.02 | 0.07 | 0.03 | <0.02 | <0.02 | <0.02 |
| Cu (g/t) | 880 | 990 | 1100 | 95 | 65 | 63 |
| Pb (%) | 0.29 | 0.17 | 0.80 | 0.3 | 1.09 | 0.67 |
| Zn (g/t) | 370 | 160 | 690 | 740 | 15000 | 2000 |
| Ga (g/t) | <2 | 7 | <2 | 3 | 4 | 4 |
| S (%) | 0.03 | 0.06 | 0.14 | 0.17 | 1.05 | 0.16 |

TABLE 7

| Sample | NaOCl Addition Method | Leak Time (h) | Extraction (%) | | | | | | |
|---|---|---|---|---|---|---|---|---|---|
| | | | In | Ag | Au | Cu | Pb | Zn | Ga |
| 08-1 | 1 g/L NaOCl | 6 | 58.8 | 87.6 | | | | | |
| 08-1 | ORP + 950 mV | 24 | 69.8 | 85.8 | 55.0 | 94.7 | 85.4 | 63.7 | 26.3 |
| 08-2 | 1 g/L NaOCl | 6 | 15.5 | 92.9 | | | | | |
| 08-2 | ORP + 950 mV | 24 | 32.3 | 91.9 | 29.3 | 46.7 | 17.0 | 38.5 | 9.5 |
| 08-3 | 1 g/L NaOCl | 6 | 41.1 | 65.0 | | | | | |

TABLE 7-continued

| Sample | NaOCl Addition Method | Leach Time (h) | Extraction (%) | | | | | | |
|---|---|---|---|---|---|---|---|---|---|
| | | | In | Ag | Au | Cu | Pb | Zn | Ga |
| 08-3 | ORP + 950 mV | 24 | 60.2 | 96.9 | 77.1 | 90.3 | 83.3 | 55.9 | 25.2 |
| 08-4 | 1 g/L NaOCl | 6 | 72.0 | 87.4 | | | | | |
| 08-4 | ORP + 950 mV | 24 | 88.8 | 81.9 | 77.1 | 70.0 | 58.7 | 65.8 | 43.7 |
| 08-5 | 1 g/L NaOCl | 6 | 26.5 | 45.8 | | | | | |
| 08-5 | ORP + 950 mV | 24 | 93.6 | 95.4 | 77.3 | 87.2 | 95.8 | 98.8 | 8.2 |
| 08-6 | 1 g/L NaOCl | 6 | 40.5 | 62.4 | | | | | |
| 08-6 | ORP + 950 mV | 24 | 77.8 | 87.1 | 74.7 | 91.0 | 88.2 | 96.0 | 31.6 |

Example 2

Acid Chloride Heap Leach Amenability Test

Samples 08-1 to 08-6, 09-1, 09-2, 10-1 and 10-2 were subjected to acid bottle roll tests using various solutions leach solutions and grind sizes. The chemical analysis of samples 09-1, 09-2, 10-1 and 10-2 are shown in Table 8. The conditions for the acid bottle roll tests are shown in Table 9. The acid chloride leach extractions from Samples 09-1, 09-2, 10-1 and 10-2 are shown in Table 10.

TABLE 8

| Element | 09-1 | 09-2 | 10-1 | 10-2 |
|---|---|---|---|---|
| In (g/t) | 12 | 11 | 3.2 | 2.9 |
| Ag (g/t) | 98.5 | 31.9 | 108 | 30.5 |
| Au (g/t) | <0.02 | 0.3 | 0.02 | <0.02 |
| Cu (g/t) | 190 | 40 | 570 | 97 |
| Pb (%) | 0.36 | 0.082 | 0.15 | 0.16 |
| Zn (g/t) | 290 | 180 | 1.5 | 1.4 |
| Ga (g/t) | 2 | 2.9 | 2.1 | 3.5 |

TABLE 9

| Test | Sample | Wgt. (kg) | Grind | T (° C.) | % Solids | ORP (mV) | Time (days) | Acid (g/L) | NaCl (mol/L) |
|---|---|---|---|---|---|---|---|---|---|
| BRL1 | 08-1 | 0.5 | K80 - 917 μm | 15-25 | 40 | 950 | 14 | 100-H$_2$SO$_4$ | 3 |
| BRL2 | 08-2 | 0.5 | K80 - 2331 μm | 15-25 | 40 | 950 | 14 | 100-H$_2$SO$_4$ | 3 |
| BRL3 | 08-3 | 0.5 | K80 - 1298 μm | 15-25 | 40 | 950 | 14 | 100-H$_2$SO$_4$ | 3 |
| BRL4 | 08-4 | 0.5 | K80 - 963 μm | 15-25 | 40 | 950 | 14 | 100-H$_2$SO$_4$ | 3 |
| BRL5 | 08-5 | 0.5 | K80 - 325 μm | 15-25 | 40 | 950 | 14 | 100-H$_2$SO$_4$ | 3 |
| BRL6 | 08-6 | 0.5 | K80 - 398 μm | 15-25 | 40 | 950 | 14 | 100-H$_2$SO$_4$ | 3 |
| BRL7 | 09-1 | 1 | 100% - 1 inch | 15-25 | 50 | 950 | 56 | 100-HCl | 4 |
| BRL8 | 09-2 | 1 | 100% - 1 inch | 15-25 | 50 | 950 | 56 | 100-HCl | 4 |
| BRL9 | 09-1 | 1 | K80 - ⅜ inch | 15-25 | 50 | 950 | 56 | 100-HCl | 4 |
| BRL10 | 09-2 | 1 | K80 - ⅜ inch | 15-25 | 50 | 950 | 56 | 100-HCl | 4 |
| BRL11 | 09-1 | 1 | K80 - ¼ inch | 15-25 | 50 | 950 | 56 | 100-HCl | 4 |
| BRL12 | 09-1 | 1 | 100% - 4 mesh | 15-25 | 50 | 950 | 56 | 100-HCl | 4 |
| BRL13 | 09-1 | 1 | 100% - 10 mesh | 15-25 | 50 | 950 | 56 | 100-HCl | 4 |
| BRL14 | 09-1 | 1 | 100% - 28 mesh | 15-25 | 50 | 950 | 56 | 100-HCl | 4 |
| BRL15 | 10-1 | 5 | K80 - 40 mm | 15-25 | 50 | 950 | 56 | 100-HCl | 4 |
| BRL16 | 10-2 | 5 | K80 - 40 mm | 15-25 | 50 | 950 | 56 | 100-HCl | 4 |

TABLE 10

| Test | Sample | Extraction (%) | | | | | | |
|---|---|---|---|---|---|---|---|---|
| | | In | Ag | Au | Cu | Pb | Zn | Ga |
| BRL1 | 08-1 | 45 | 47 | 46 | 87 | 70 | 26 | 2 |
| BRL2 | 08-2 | 9 | 53 | 47 | 27 | 8 | 18 | 3 |
| BRL3 | 08-3 | 27 | 20 | 47 | 82 | 39 | 22 | 2 |
| BRL4 | 08-4 | 55 | 43 | 46 | 28 | 23 | 18 | 11 |
| BRL5 | 08-5 | 47 | 70 | 57 | 53 | 42 | 56 | 3 |
| BRL6 | 08-6 | 20 | 24 | 48 | 33 | 27 | 62 | 1 |
| BRL7 | 09-1 | 81 | 53 | 23 | 67 | 69 | 71 | 17 |
| BRL8 | 09-2 | 79 | 34 | 21 | 47 | 99 | 56 | 10 |
| BRL9 | 09-1 | 86 | 67 | 57 | 83 | 87 | 68 | 25 |
| BRL10 | 09-2 | 83 | 35 | 57 | 62 | 99 | 61 | 10 |
| BRL11 | 09-1 | 92 | 59 | 21 | 85 | 91 | 79 | 30 |
| BRL12 | 09-1 | 92 | 65 | 20 | 84 | 91 | 74 | 33 |
| BRL13 | 09-1 | 92 | 69 | 24 | 90 | 93 | 83 | 33 |
| BRL14 | 09-1 | 94 | 78 | 23 | 88 | 93 | 83 | 41 |
| BRL15 | 10-1 | 76 | 44 | 22 | 78 | 70 | 63 | 11 |
| BRL16 | 10-2 | 91 | 52 | 19 | 75 | 81 | 60 | 16 |

Example 3

Acid Neutralization of Leachate

A sample of acid-chloride leachate was treated with limestone to neutralize excess free acid, prior to recovery of valuable metals. The solution analyzed comprised about 9.4 g/L Fe, about 3.8 g/L Pb, about 62.5 mg/L Ag and about 21 mg/L In. The pH was increased to about 1, about 1.5, about 1.75, about 2, about 2.5 using increments of dry pulverized limestone. The analysis of the key elements in solution as a function of pH for neutralization of the leach solution are shown in Table 11. The temperature of the precipitation was about 21° C. The results show that at pH of about 1.5 and less, iron is not precipitated.

TABLE 11

| pH | Assay (mg/L) | | | |
|---|---|---|---|---|
| | Fe | Pb | Ag | In |
| Initial | 9400 | 3800 | 62.5 | 21 |
| 1.00 | 9500 | 3700 | 57 | 21 |
| 1.50 | 9500 | 3600 | 58 | 22 |
| 1.75 | 9200 | 3700 | 56 | 21 |
| 2.00 | 300 | 3600 | 55 | 20 |
| 2.49 | 22 | 3300 | 52 | 19 |

Example 4

Cementation of Ag, Cu and Au

A sample of neutralized leachate (to pH of about 1.25) was treated with 110% of the iron powder required to cement silver, gold and copper from solution as well as reduce all ferric ion to ferrous. This was done at about 21° C. in a 20 L reactor with a 300 rpm of agitation. Table 12 shows the analysis of feed and product solutions and solid cement recovered from the cementations test (i.e., the initial and final solution composition and the cement composition). The results indicate near quantitative removal of silver, copper and gold from solution, along with arsenic and antimony. Small amounts of lead, gallium, and aluminum were also precipitated.

Example 5

Precipitation of In and Ga

A sample of leachate (after neutralization and cementation) was treated with 25 g/L NaOH solution at 2° C. to a pH of 5.5 to precipitate indium and gallium from solution. The indium and gallium hydroxide precipitate was filtered and washed. Table 13 shows the analytical results for feed and product solutions and solids from indium and gallium precipitation at a pH of 5.5. Indium and gallium are nearly quantitatively precipitated at pH 5.5.

Example 6

Precipitation of Lead and Zinc Sulfides

A sample of solution after indium and gallium precipitation at pH 5.5 was treated with 50 g/L NaSH in order to precipitate lead and zinc sulfide from solution. The ORP and pH of the reaction mixture were monitored with NaSH addition. For lead precipitation, a target ORP of 0 mV was set after which the lead precipitate was filtered from solution. The solution was then treated to a target ORP of −200 mV through further addition of NaSH solution. The pH was not controlled. Table 14 shows the analytical results for feed and product solutions and solids from lead and zinc precipitation with NaSH. The PbS synthetic precipitate analyzed 75.4% Pb with minor contamination of other elements. However, the PbS filtrate still contained 1.31 g/L Pb. It would have been advantageous to add more NaSH to precipitate lead to a lower concentration before filtering the PbS precipitate. The ZnS synthetic precipitate analyzed 14% Zn and 61.6% Pb. This mixed precipitate could be toll smelted for recovery of these elements at an Imperial Smelting plant.

TABLE 12

| Product | Amount | Assay (mg/L, g/t) | | | | | | | | | | | | |
|---|---|---|---|---|---|---|---|---|---|---|---|---|---|---|
| min | (ml, g) | Fe | Fe(II) | Fe(III) | Pb | Ag | Au | In | Ga | Al | As | Cu | Sb | Zn |
| Feed Solution | 14084 | 8100 | 71 | 8029 | 3800 | 54.3 | 0.04 | 21 | 0.9 | 680 | 82 | 218 | 110 | 320 |
| Fe Powder Added | 77.1 | 100% | | | | | | | | | | | | |
| Product Solution | 14114 | 12000 | 11600 | 400 | 3500 | 0.81 | 0.01 | 21 | 0.40 | 610 | 9 | 6.11 | 21 | 320 |
| Solid Cement | 39.8 | 442000 | | | 21500 | 18645 | 14.8 | 130 | 180 | 12000 | 21700 | 71900 | 21900 | 53 |

TABLE 13

| Product | Amount | Assay (mg/L, g/t) | | | | | | | | | | | | |
|---|---|---|---|---|---|---|---|---|---|---|---|---|---|---|
| min | (ml, g) | Fe | Fe(II) | Fe(III) | Pb | Ag | Au | In | Ga | Al | As | Cu | Sb | Zn |
| Feed | 13847 | 12000 | 11400 | | 3800 | 0.5 | <0.01 | 20 | 0.2 | 620 | 6 | 5 | 27 | 330 |
| pH 5.5 PLS | 15148 | 9900 | 9820 | | 3320 | <0.03 | <0.02 | 0.09 | <0.05 | <0.9 | <3 | 3.2 | <1 | 291 |
| final RES | 68.2 | 130000 | | | 39900 | 274 | NR | 5800 | 120 | 180000 | 2600 | 870 | 5300 | 6600 |

TABLE 14

| Product | Amount (ml, g) | Assay (mg/L, g/t) | | | | | | | | |
|---|---|---|---|---|---|---|---|---|---|---|
| | | Zn | Pb | Fe | Fe(II) | Ca | Mg | Mn | Na | S |
| Feed | 12695 | 291 | 3320 | 9900 | 9820 | 21000 | 610 | 68 | 77000 | |
| PbS Filtrate | 50 | 268 | 1310 | 11000 | | 21000 | 590 | 64 | 70000 | |
| ZnS Filtrate | 14030 | 1.23 | 1 | 9500 | | 19000 | 530 | 57 | 64000 | |
| PbS ppt | 27.2 | 120 | 754000 | 9800 | | 200 | <20 | 7 | 270 | 12.1 |
| ZnS ppt | 27.3 | 140000 | 616000 | 24000 | | 800 | 26 | 13 | 640 | 17.3 |

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as any open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing.

Example 7

The Stripping of a Loaded and Scrubbed Organic Solvent for Recovery of an Iron Chloride and Hydrochloric Acid Solution for Iron Recovery and Acid Recycle A loaded and scrubbed organic solution (100% TBP) was prepared to contain about 40090 mg/L Fe and about 32.5 g/L HCl at room temperature. This organic solution was stripped with water at organic to aqueous phase ratios of about 6:1 to 1:4. The stripped organic and aqueous strip solution was analyzed for iron and acid concentrations. These values are shown below.

Figure 3:
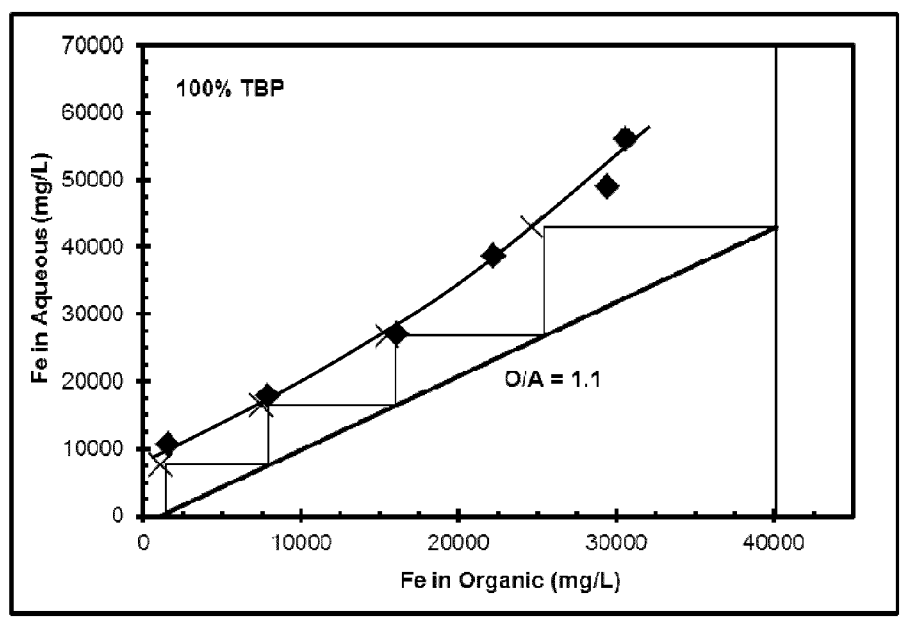
FIG. 3 is a McCabe-Thiele isotherm showing the results relating to iron stripping.

The results (Table 15 and FIG. 3) show that it is possible to recover iron and acid from the loaded organic solvent using a water stripping process. The iron stripping results are shown in the form of a McCabe-Thiele isotherm in FIG. 3. This isotherm indicates that it would be possible to strip the loaded organic to low residual iron loadings in 4 stages at an O/A ratio of 1.1 to form a strip solution of greater than about 40 g/L Fe. This strip solution would proceed to acid recovery and iron hydrolysis.

TABLE 15

| | | Feed | O/A Ratio | | | | | |
|---|---|---|---|---|---|---|---|---|
| | | | 6:1 | 4:1 | 2:1 | 1:1 | 1:2 | 1:4 |
| Iron | Organic (mg/L) | 40090 | 30580 | 29430 | 22200 | 16060 | 7920 | 1560 |
| | Aqueous (mg/L) | 0 | 56000 | 49000 | 38600 | 27100 | 17900 | 10700 |
| HCl | Organic (g/L) | 32.5 | 28 | 27 | 24 | 17 | 9 | 0 |
| | Aqueous (g/L) | 0 | 25.0 | 21.4 | 19.3 | 15.6 | 12.0 | 8.1 |

Example 8

The Initial Boiling of the SX Strip Solution to Concentrate the Iron and Acid Levels A solvent extraction strip solution containing about 29.1 g/L Fe (as $FeCl_3$) and about 26.4 g/L HCl was placed in a glass beaker and boiled down in order to concentrate the iron and acid levels in solution. The evaporated vapour was collected and condensed. The results are shown in Table 16. The condensate contained very little acid (about 4.56 g/L) and was free of any iron content. The concentrated solution remaining after the initial boiling contained about 104.0 g/L Fe and about 77.3 g/HCl, representing a significant concentration of the iron and acid species.

TABLE 16

| Stream | Quantity mL | Assays, g/L | |
|---|---|---|---|
| | | Fe | HCl |
| Feed | 3079 | 29.1 | 26.4 |
| Condensate | 2234 | 0 | 4.56 |
| Remaining Solution | 878 | 104.0 | 77.3 |

Example 9

The Further Boiling of a SX Strip Solution to Concentrate the Iron and Acid Levels and Form Hematite by Hydrolysis A solution containing about 97.7 g/L Fe and about 80.8 g/L HCl, representing a solution that had already been pre-concentrated by boiling off some of the water from solution, was further boiled. The evaporated water and hydrochloric acid was collected and condensed. At the end of the test, the boiled down solution was very concentrated in iron chloride and acid. To facilitate recovery of this solution (and filtration of any solids that had formed by hydrolysis of the iron chloride), a volume of about 420 mL of about 5 g/L HCl solution was added (this solution is named an aqueous diluent). The diluted final solution was filtered and the solids collected and analyzed for iron content. The results are shown in Table 17.

The condensate represented about ⅔ of the original feed solution and contained about 72.3 g/L HCl. This HCl would be available for recycle to the acid leaching process for ore treatment. The filtrate was very concentrated in iron (about 236 g/L) and acid (about 76.2 g/L). A small amount of solids, analyzing about 70% iron was collected as evidence of iron hydrolysis to form hematite.

TABLE 17

| Stream | Quantity mL | Assays, g/L Fe | HCl |
|---|---|---|---|
| Feed | 3000 | 97.7 | 80.8 |
| Aqueous Diluent | 420 | 0 | 5.0 |
| Condensate | 2004 | 0 | 72.3 |
| Filtrate | 1305 | 236 | 76.2 |
| Residue | 6.5 g | 70% | 0 |

Example 10

The Further Boiling of a SX Strip Solution to Concentrate the Iron and Acid Levels and Form Hematite by Hydrolysis A solution containing about 396 g/L Fe and about 111 g/L HCl, representing a solution that had already been pre-concentrated and partly hydrolyzed by boiling off some of the water from solution, was further boiled. The evaporated water and hydrochloric acid was collected and condensed. At the end of the test, the boiled down solution was very concentrated in iron chloride and acid. To facilitate recovery of this solution (and filtration of any solids that had formed by hydrolysis of the iron chloride), a volume of about 420 mL of about 5 g/L HCl solution was added (this solution is named an aqueous diluent). The diluted final solution was filtered and the solids collected and analyzed for iron content. The results are shown in Table 18.

The condensate represented about ⅓ of the original feed solution and contained about 365 g/L HCl. This HCl would be available for recycle to the acid leaching process for ore treatment. The filtrate was very concentrated in iron (about 467 g/L). A large amount of solids (about 72.5 g), analyzing about 70% iron was collected as evidence of iron hydrolysis to form hematite.

TABLE 18

| Stream | Quantity mL | Assays, g/L Fe | HCl |
|---|---|---|---|
| Feed | 3001 | 396 | 111 |
| Aqueous Diluent | 420 | 0 | 5 |
| Condensate | 1055 | 0 | 365 |
| Filtrate | 2361 | 467 | NA |
| Residue | 72.5 g | 70% | 0 |

The invention claimed is:

1. A method for recovering a metal from an ore comprising rare, precious, base metals or a combination thereof, the method comprising:
    contacting the ore with an acid, a chloride salt and a soluble oxidant under a selected condition to form an ore waste and an acid-soluble oxidant leach solution comprising the metal;
    modulating an acid concentration in the acid-soluble oxidant leach solution, including acid recovery from the acid-soluble oxidant leach solution to form a recovered acid and an acid-depleted leach solution comprising a residual acid;
    recycling the recovered acid to the contacting step;
    neutralizing the residual acid in the acid-depleted leach solution by contacting the acid-depleted leach solution with a neutralizing agent comprising calcium carbonate; and
    separating the acid-soluble oxidant leach solution from the ore waste.

2. The method of claim 1 wherein the ore is an oxide ore, a sulfide ore or a combination thereof.

3. The method of claim 1 wherein the precious metals comprise silver, gold or a combination thereof.

4. The method of claim 1 wherein the rare metals comprise indium, gallium or a combination thereof.

5. The method of claim 1 wherein the base metals comprise copper, lead, zinc or a combination thereof.

6. The method of claim 1 wherein the chloride salt comprises NaCl, KCl, $CaCl_2$, $MgCl_2$ or a combination thereof.

7. The method of claim 1 wherein the soluble oxidant comprises sodium hypochlorite, sodium chlorate, sodium chlorite, gaseous chlorine, hypochlorous acid or a combination thereof.

8. The method of claim 1 wherein the acid comprises sulfuric acid, hydrochloric acid, or a combination thereof.

9. The method of claim 8 wherein the sulfuric acid has a concentration ranging from about 10 g/L to about 100 g/L of acid.

10. The method of claim 1 wherein the chloride salt has a concentration ranging from about 1 mol/L to about 3.5 mol/L.

11. The method of claim 1 wherein the acid-soluble oxidant leach solution comprises an acid-chloride leach solution.

12. The method of claim 1 wherein the contacting comprises heap leaching, vat leaching, stirred reactor leaching, mixing, agitating or a combination thereof.

13. The method of claim 1 wherein the selected condition comprises a selected temperature.

14. The method of claim 13 wherein the selected temperature ranges from about ambient temperature to a temperature at a boiling point.

15. The method of claim 2 wherein the oxide ore, sulfide ore or a combination thereof is pretreated.

16. The method of claim 15 wherein the pretreatment comprises dry grinding, wet grinding or a combination thereof.

17. The method of claim 16 wherein the pretreatment produces particles having a size ranging from about 50 mm or more.

18. The method of claim 16 wherein the pretreatment produces a fine ore material and a coarse ore material.

19. The method of claim 18 wherein the fine ore material and the coarse ore material are treated separately recycled to the contacting step.

20. The method of claim 2 wherein the chloride salt comprises NaCl, KCl, $CaCl_2$, $MgCl_2$ or a combination thereof.

21. The method of claim 2 wherein the acid comprises sulfuric acid, hydrochloric acid, or a combination thereof.

22. A method for recovering a metal from an ore comprising rare, precious, base metals or a combination thereof, the method comprising:
    contacting the ore with an acid, a chloride salt and a soluble oxidant under a selected condition to form an ore waste and an acid-soluble oxidant leach solution comprising the metal;
    modulating an acid concentration in the acid-soluble oxidant leach solution, including acid recovery from the acid-soluble oxidant leach solution to form a recovered acid and an acid-depleted leach solution comprising a residual acid;

separating the rare metal from the acid-depleted leach solution to recover the rare metal; and separating the acid-soluble oxidant leach solution from the ore waste, wherein the step of separating the rare metal from the acid-depleted leach solution comprises cementation, precipitation or a combination thereof, the precipitation including a pH adjustment, an addition of a source of sulfide, aeration or a combination thereof, the pH adjustment including an addition of sodium hydroxide, limestone, or a combination thereof so that the pH adjustment results in a pH of about 1 to about 1.25, about 1.25 to about 1.5, about 5.0 to about 5.5, or about 5.5 to about 6.0.

23. The method of claim 22 wherein the source of sulfide comprises sodium hydrogen sulfide, hydrogen sulfide gas or a combination thereof.

24. The method of claim 22 wherein the cementation produces a cement comprising Au, Ag, Cu or a combination thereof.

25. A method for recovering a metal from an ore comprising rare, precious, base metals or a combination thereof, the method comprising:

contacting the ore with an acid, a chloride salt and a soluble oxidant under a selected condition to form an ore waste and an acid-soluble oxidant leach solution comprising the metal;

modulating an acid concentration in the acid-soluble oxidant leach solution, including acid recovery from the acid-soluble oxidant leach solution to form a recovered acid and an acid-depleted leach solution comprising a residual acid;

recovering the rare metal from the acid-depleted leach solution by separating the rare metal from the acid-depleted leach solution by cementation, precipitation or a combination thereof;

adding seed material to the precipitation; and separating the acid-soluble oxidant leach solution from the ore waste.

26. The method of claim 25 wherein the precipitation produces a product comprising gypsum, In/Ga hydroxide, PbS, ZnS, or $Fe(OH)_3$.

27. A method for recovering a metal from an ore comprising rare, precious, base metals or a combination thereof, the method comprising:

contacting the ore with an acid, a chloride salt and a soluble oxidant under a selected condition to form an ore waste and an acid-soluble oxidant leach solution comprising the metal;

modulating an acid concentration in the acid-soluble oxidant leach solution, including acid recovery from the acid-soluble oxidant leach solution to form a recovered acid and an acid-depleted leach solution comprising a residual acid, wherein the acid recovery comprises a solvent extraction including contacting the acid-soluble oxidant leach solution with a solvent to form a loaded solvent having an extracted species, the solvent being an solvating extractant comprising an alkyl phosphate, an alkyl phosphonate, an alkyl phosphinate or a combination thereof; and separating the acid-soluble oxidant leach solution from the ore waste.

28. The method of claim 27 wherein the alkyl phosphate is tri-butyl-phosphate.

29. The method of claim 27 wherein the alkyl phosphonate is di-butyl-butyl phosphonate.

30. The method of claim 27 wherein the extracted species is an iron chloride-hydrochloric acid species.

31. The method of claim 30 wherein the iron chloride-hydrochloric acid species is $HFeCl_4$.

32. The method of claim 27 wherein the loaded solvent is scrubbed with an aqueous solution to form a washed loaded solvent comprising $FeCl_3$ and HCl.

33. The method of claim 32 wherein the aqueous solution is water.

34. The method of claim 32 wherein the washed loaded solvent is further stripped with additional water to form a solution comprising $FeCl_3$ and HCl.

35. The method of claim 34 wherein the solution comprising $FeCl_3$ and HCl is subjected to pre-evaporation to form a pre-evaporated $FeCl_3$ and HCl solution.

36. The method of claim 35 wherein the pre-evaporated $FeCl_3$ and HCl solution is subjected to thermal decomposition.

37. The method of claim 36 wherein the thermal decomposition is performed using spray roasting, pyrohydrolysis, heating or a combination thereof.

38. The method of claim 36 wherein the thermal decomposition is performed at a temperature of about 180° C. or more.

39. The method of claim 36 wherein the thermal decomposition converts the iron chloride to hematite, regenerates the hydrochloric acid or both.

40. The method of claim 39 wherein the regenerated hydrochloric acid is condensed, recycled back to the contacting step.

41. The method of claim 39 wherein the hematite is recovered as a valuable product.

42. The method for recovering a metal from an ore comprising rare, precious, base metals or a combination thereof, the method comprising:

contacting the ore with an acid, a chloride salt and a soluble oxidant under a selected condition to form an ore waste and an acid-soluble oxidant leach solution comprising the metal;

modulating an acid concentration in the acid-soluble oxidant leach solution, including acid recovery from the acid-soluble oxidant leach solution to form a recovered acid and an acid-depleted leach solution comprising a residual acid;

neutralizing the residual acid in the acid-depleted leach solution by adding limestone, dolomite, lime, sodium hydroxide or a combination thereof to form a neutralized acid-depleted leach solution having Au and Ag;

subjecting the neutralized acid-depleted leach solution having Au and Ag to cementation to produce a cementate of Au and Ag and a cementation solution substantially free of Au and Ag; and separating the acid-soluble oxidant leach solution from the ore waste.

43. The method of claim 42 wherein the cementation solution substantially free of Au and Ag comprises copper.

44. The method of claim 43 wherein the cementation solution substantially free of Au and Ag is subjected to iron cementation to recover copper to produce a precious metal precipitate and a copper product.

45. The method of claim 44 wherein the precious metal precipitate is processed to precipitate In and Ga to produce a hydroxide of In and Ga, and a solution depleted in In and Ga.

46. The method of claim 45 wherein the precipitation is performed by raising the pH.

47. The method of claim 46 wherein raising the pH comprises an addition of a base.

48. The method of claim 47 wherein the base comprises sodium hydroxide, calcium carbonate, calcium hydroxide, magnesium oxide or a combination thereof.

49. The method of claim 47 wherein the pH adjustment results in a pH of about 1 to about 1.25, about 1.25 to about 1.5, about 5.0 to about 5.5, or about 5.5 to about 6.0.

50. The method of claim 45 wherein the solution depleted in In and Ga is sulphidized to precipitate Pb and Zn as separate sulfide concentrates.

51. The method of claim 50 wherein the sulphidization is performed using a sulfide.

52. The method of claim 51 wherein the sulfide is NaSH.

* * * * *